US010465047B2

(12) United States Patent
Jing et al.

(10) Patent No.: US 10,465,047 B2
(45) Date of Patent: Nov. 5, 2019

(54) POLYMERIZABLE POLYDIMETHYLSILOXANE-POLYOXYALKYLENE BLOCK COPOLYMERS

(71) Applicant: Novartis AG, Basel (CH)

(72) Inventors: Feng Jing, Snellville, GA (US); Frank Chang, Cumming, GA (US)

(73) Assignee: Novartis AG, Basel (CH)

( * ) Notice: Subject to any disclaimer, the term of this patent is extended or adjusted under 35 U.S.C. 154(b) by 113 days.

(21) Appl. No.: 15/727,674

(22) Filed: Oct. 9, 2017

(65) Prior Publication Data

US 2018/0100038 A1 Apr. 12, 2018

Related U.S. Application Data

(60) Provisional application No. 62/406,467, filed on Oct. 11, 2016.

(51) Int. Cl.

| | | |
|---|---|---|
| *C08G 77/442* | (2006.01) | |
| *C08G 77/38* | (2006.01) | |
| *G02C 7/04* | (2006.01) | |
| *C08F 20/06* | (2006.01) | |
| *C08F 26/10* | (2006.01) | |
| *C08F 299/08* | (2006.01) | |
| *C08G 77/20* | (2006.01) | |
| *C08G 77/46* | (2006.01) | |

(52) U.S. Cl.
CPC ............ *C08G 77/442* (2013.01); *C08F 20/06* (2013.01); *C08F 26/10* (2013.01); *C08F 299/08* (2013.01); *C08G 77/20* (2013.01); *C08G 77/38* (2013.01); *C08G 77/46* (2013.01); *G02C 7/049* (2013.01); *C08F 2800/20* (2013.01); *C08G 2210/00* (2013.01)

(58) Field of Classification Search
CPC .................................................. C08G 77/442
See application file for complete search history.

(56) References Cited

U.S. PATENT DOCUMENTS

| | | | |
|---|---|---|---|
| 4,179,337 A | 12/1979 | Davis et al. |
| 4,259,467 A | 3/1981 | Keogh et al. |
| 4,260,725 A | 4/1981 | Keogh et al. |
| 4,444,711 A | 4/1984 | Schad |
| 4,460,534 A | 7/1984 | Boehm et al. |
| 5,034,461 A | 7/1991 | Lai et al. |
| 5,206,344 A | 4/1993 | Katre et al. |
| 5,346,946 A | 9/1994 | Yokoyama et al. |
| 5,416,132 A | 5/1995 | Yokoyama et al. |
| 5,449,729 A | 9/1995 | Lai |
| 5,486,579 A | 1/1996 | Lai et al. |
| 5,512,205 A | 4/1996 | Lai |
| 5,760,100 A | 6/1998 | Nicolson et al. |
| 5,843,346 A | 12/1998 | Morrill |
| 5,894,002 A | 4/1999 | Boneberger et al. |
| 5,994,488 A | 11/1999 | Yokota et al. |
| 6,367,929 B1 | 4/2002 | Maiden et al. |
| 6,627,124 B1 | 9/2003 | Herbrechtsmeier et al. |
| 6,719,929 B2 | 4/2004 | Winterton et al. |
| 6,800,225 B1 | 10/2004 | Hagmann et al. |
| 6,822,016 B2 | 11/2004 | McCabe et al. |
| 6,858,218 B2 | 2/2005 | Lai et al. |
| 6,867,245 B2 | 3/2005 | Iwata et al. |
| 7,384,590 B2 | 6/2008 | Moszner et al. |
| 7,387,759 B2 | 6/2008 | Kelly et al. |
| 7,605,190 B2 | 10/2009 | Moszner et al. |
| 7,671,156 B2 | 3/2010 | Phelan et al. |
| 7,744,785 B2 | 6/2010 | Phelan |
| 7,858,000 B2 | 12/2010 | Winterton |
| 7,915,323 B2 | 3/2011 | Awasthi et al. |
| 8,129,442 B2 | 3/2012 | Ueyama et al. |
| 8,147,897 B2 | 4/2012 | Ferreiro et al. |
| 8,163,206 B2 | 4/2012 | Chang et al. |
| 8,318,144 B2 | 11/2012 | Ketelson et al. |
| 8,409,599 B2 | 4/2013 | Wu et al. |
| 8,420,711 B2 | 4/2013 | Awasthi et al. |
| 8,445,614 B2 | 5/2013 | Francis et al. |
| 8,501,833 B2 | 8/2013 | Phelan |
| 8,513,325 B2 | 8/2013 | Liu et al. |
| 8,524,850 B2 | 9/2013 | Ueyama et al. |
| 8,529,057 B2 | 9/2013 | Qiu et al. |
| 8,835,525 B2 | 9/2014 | Kuyu et al. |
| 8,993,651 B2 | 3/2015 | Chang et al. |
| 9,097,840 B2 | 8/2015 | Chang et al. |
| 9,103,965 B2 | 8/2015 | Chang |
| 9,187,601 B2 | 11/2015 | Huang et al. |
| 9,475,827 B2 | 10/2016 | Chang et al. |
| 2003/0149307 A1 | 8/2003 | Hai et al. |
| 2009/0143499 A1 | 6/2009 | Chang et al. |
| 2011/0134387 A1 | 6/2011 | Samuel et al. |
| 2012/0026457 A1 | 2/2012 | Qiu et al. |
| 2012/0220690 A1 | 8/2012 | Liu et al. |

(Continued)

FOREIGN PATENT DOCUMENTS

EP 0632329 A1 1/1995

OTHER PUBLICATIONS

De Vos and Goethals; Convenient synthesis of a-tosyl-w-tosyloxypoly(oxyethylene); Makromol. Chem., Rapid Commun. vol. 6, pp. 53-56; (1985).

(Continued)

*Primary Examiner* — Tae H Yoon
(74) *Attorney, Agent, or Firm* — Jian Zhou

(57) ABSTRACT

The invention provides a polymerizable polydimethylsiloxane-polyoxyalkylene block copolymer which comprises (1) a linear polymer chain comprising at least two polydimethylsiloxane segments, one hydrophilic polyoxyalkylene segment between each pair of polydimethylsiloxane segments, and one amide-rich linker between each pair of one polydimethylsiloxane segment and one hydrophilic polyoxyalkylene segment, and (2) two terminal (meth)acryloyl groups. The hydrophilized polydiorganosiloxane vinylic crosslinker has a weight average molecular weight of at least 3000 Daltons. The invention is also related to a silicone hydrogel contact lens produced from a polymerizable polydimethylsiloxane-polyoxyalkylene block copolymer of the invention.

15 Claims, No Drawings

(56) References Cited

U.S. PATENT DOCUMENTS

| | | |
|---|---|---|
| 2012/0244088 A1 | 9/2012 | Saxena et al. |
| 2012/0245249 A1 | 9/2012 | Saxena et al. |
| 2013/0118127 A1 | 5/2013 | Kolluru et al. |
| 2014/0171539 A1 | 6/2014 | Chang et al. |
| 2015/0309210 A1 | 10/2015 | Huang et al. |
| 2015/0309211 A1 | 10/2015 | Huang et al. |
| 2016/0090432 A1 | 3/2016 | Chang et al. |

OTHER PUBLICATIONS

Bückmann et al.; "Preparation of technical grade polyethylene glycol (PEG) (Mr20,000)-N6-(2-aminoethyl-NADH by a procedure adaptable to large-scale synthesis"; Biotechnology and Applied Biochemistry; Academic Press, Inc., vol. 9, Issue 3; pp. 258-268, (1987).

Pieter Espeel et al., One-pot double modification of polymers based on thiolactone chemistry, Advances in Polymer Science, vol. 269; pp. 105-132, (2015).

Pieter Espeel et al., One-pot multi-step reactions based on thiolactone chemistry : A powerful synthetic tool in polymer science, European Polymer Journal, vol. 62; pp. 247-272, (2015).

Devatha P. Nair, et al., The Thiol-Michael Addition Click Reaction: A Powerful and Widely Used Tool in Materials Chemistry, Chemistry of Materials, vol. 26, pp. 724-744 (2014).

Shunsuke Chatani et al., Relative reactivity and selectivity of vinyl sulfones and acrylates towards the thiol-Michael addition reaction and polymerization, Polymer Chemistry, vol. 4; pp. 1048-1055 (2013).

POLYMERIZABLE POLYDIMETHYLSILOXANE-POLYOXYALKYLENE BLOCK COPOLYMERS

This application claims the benefit under 35 USC § 119(e) of U.S. provisional application No. 62/406,467 filed 11 Oct. 2016, herein incorporated by reference in its entirety.

The present invention is related to a class of di-(meth)acryloyl-terminated polydimethylsiloxane-polyoxyalkylene block copolymers, lens formulations which comprise such polydimethylsiloxane-polyoxyalkylene block copolymers and are suitable for making silicone hydrogel contact lenses. In addition, the present invention is related to silicone hydrogel contact lenses made from such a lens formulation.

BACKGROUND

In recent years, soft silicone hydrogel contact lenses become more and more popular because of their high oxygen permeability and comfort. "Soft" contact lenses can conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the lens to the cornea and to have minimal adverse effects on corneal health.

One of lens forming materials widely used in making silicone hydrogel contact lenses is a polydiorganosiloxane (e.g., polydimethylsiloxane) vinylic crosslinker which can provide high oxygen permeability to resultant contact lenses. But, a polydimethylsiloxane vinylic crosslinker can affect the mechanical properties, e.g., elastic modulus, of the resultant contact lenses. For example, a low molecular weight polydimethylsiloxane vinylic crosslinker (<2,000 g/mol) may provide a resultant contact lens with a relatively high elastic modulus in order to achieve a desired oxygen permeability. A relative high molecular weight polydimethylsiloxane vinylic crosslinker is typically used in achieve both the high oxygen permeability and the low elastic modulus. However, because of its hydrophobic nature, a polydimethylsiloxane vinylic crosslinker, especially one with high molecular weight, is not compatible with hydrophilic components in a lens formulation, including, e.g., N,N-dimethylacrylamide (DMA), N-vinylpyrrolidone (NVP), N-vinyl-N-methylacetamide (VMA), or an internal wetting agent. It would be difficult to obtain homogeneous lens formulations (i.e., clear lens formulations) from use of such a polydimethylsiloxane vinylic crosslinker.

It would be even more difficult to obtain a homogeneous, solventless lens formulation from use of such a polydimethylsiloxane vinylic crosslinker. Use of organic solvents in preparing silicone hydrogel contact lens can be costly and is not environmentally friendly.

Therefore, there is a need for new hydophilized polydiorganosiloxane vinylic crosslinkers suitable for preparing a solventless lens formulation that can be used to produce silicone hydrogel contact lenses with long thermal stability.

Documents, including U.S. Pat. Nos. 4,260,725, 5,034,461, 5,346,946, 5,416,132, 5,449,729, 5,486,579, 5,512,205, 5,760,100, 5,994,488, 6,858,218, 6,867,245, 7,671,156, 7,744,785, 8,129,442, 8,163,206, 8,501,833, 8,513,325, 8,524,850, 8,835,525, 8,993,651, and 9,187,601 and U.S. Pat. App. Pub. No. 2016/0090432 A1, disclose that various lens formulations (which are either solvent-containing or solventless formulations) comprising one or more hydrophilized polysiloxane crosslinkers can be used for making silicone hydrogel contact lenses.

SUMMARY OF THE INVENTION

The present invention, in one aspect, provides a polymerizable polydimethylsiloxane-polyoxyalkylene block copolymer. The polymerizable polydimethylsiloxane-polyoxyalkylene block copolymer of the invention comprises: (1) a linear polymer chain comprising at least two polydimethylsiloxane segments, one hydrophilic polyoxyalkylene segment between each pair of polydimethylsiloxane segments, and one amide-rich linker between each pair of one polydimethylsiloxane segment and one hydrophilic polyoxyalkylene segment; (2) two terminal (meth)acryloyl groups, wherein the polydimethylsiloxane-polyoxyalkylene block copolymer has a number-average molecular weight of at least 3000 Daltons.

In another aspect, the invention provides a silicone hydrogel contact lens comprising a crosslinked polymeric material comprising: units of a polymerizable polydimethylsiloxane-polyoxyalkylene block copolymer of the invention (described above), units of a siloxane-containing vinylic monomer, units of at least one hydrophilic vinylic monomer, wherein the silicone hydrogel contact lens, when being fully hydrated, has an oxygen permeability (Dk) of at least about 70 barrers, a water content of from about 25% to about 70% by weight, and an elastic modulus of from about 0.2 MPa to about 1.2 MPa.

In a further aspect, the present invention provides a method for producing silicone hydrogel contact lenses. The method comprises the steps of: preparing a lens-forming composition which is clear at room temperature and optionally but preferably at a temperature of from about 0 to about 4° C., wherein the lens-forming composition comprises (a) from about 5% to about 35% by weight of a polymerizable polydimethylsiloxane-polyoxyalkylene block copolymer of the invention, (b) a siloxane-containing vinylic monomer, (c) from about 30% to about 60% by weight of at least one hydrophilic vinylic monomer, (d) at least one free-radical initiator, provided that the above-listed polymerizable components and any additional polymerizable components add up to 100% by weight; introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; curing thermally or actinically the lens-forming composition in the lens mold to form a silicone hydrogel contact lens.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein in this application means that a number, which is referred to as "about", comprises the recited number plus or minus 1-10% of that recited number.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a cross-linked polymeric material which is insoluble in water, but can absorb at least 10 percent by weight of water when it is fully hydrated.

A "silicone hydrogel" refers to a silicone-containing hydrogel obtained by copolymerization of a polymerizable composition comprising at least one silicone-containing vinylic monomer or at least one silicone-containing vinylic macromer or at least one actinically-crosslinkable silicone-containing prepolymer.

"Hydrophilic," as used herein, describes a material or portion thereof that will more readily associate with water than with lipids.

A "vinylic monomer" refers to a compound that has one sole ethylenically unsaturated group and is soluble in a solvent.

The term "soluble", in reference to a compound or material in a solvent, means that the compound or material can be dissolved in the solvent to give a solution with a concentration of at least about 0.5% by weight at room temperature (i.e., a temperature of about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl

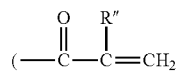

in which R" is hydrogen or methyl), allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

The term "(meth)acrylamide" refers to methacrylamide and/or acrylamide.

The term "(meth)acrylate" refers to methacrylate and/or acrylate.

The term "(meth)acrylamido" refers to a group of

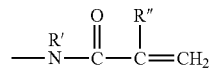

in which R' is hydrogen or $C_1$-$C_4$-alkyl and R" is hydrogen or methyl.

The term "(meth)acryloxy" refers to a group of

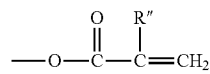

in which R" is hydrogen or methyl.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "blending vinylic monomer" refers to a vinylic monomer capable of dissolving both hydrophilic and hydrophobic components of a polymerizable composition to form a solution.

A "macromer" or "prepolymer" refers to a compound or polymer that contains ethylenically unsaturated groups and has a number-average molecular weight (Mn) greater than 700 Daltons.

A "polymer" means a material formed by polymerizing/crosslinking one or more vinylic monomers, macromers and/or prepolymers.

"Molecular weight" of a polymeric material (including monomeric or macromeric materials), as used herein, refers to the number-average molecular weight unless otherwise specifically noted or unless testing conditions indicate otherwise.

The term "alkyl" refers to a monovalent radical obtained by removing a hydrogen atom from a linear or branched alkane compound. An alkyl group (radical) forms one bond with one other group in an organic compound.

The term "alkylene" refers to a divalent radical obtained by removing one hydrogen atom from an alkyl. An alkylene group (or radical) forms two bonds with other groups in an organic compound.

In this application, the term "substituted" in reference to an alkylene divalent radical or an alkyl radical means that the alkylene divalent radical or the alkyl radical comprises at least one substituent which replaces one hydrogen atom of the alkylene or alkyl radical and is selected from the group consisting of hydroxyl, carboxyl, —$NH_2$, sulfhydryl, $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

As used herein, the term "multiple" refers to three or more.

A "vinylic crosslinker" refers to a compound having at least two ethylenically-unsaturated groups. A "vinylic crosslinking agent" refers to a compound with two or more ethylenically unsaturated groups and with molecular weight less than 700 Daltons.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "polymerizable UV-absorbing agent" or "UV-absorbing vinylic monomer" refers to a compound comprising an ethylenically-unsaturated group and a UV-absorbing moiety.

A "UV-absorbing moiety" refers to an organic functional group which can absorb or screen out UV radiation in the range from 200 nm to 400 nm as understood by a person skilled in the art.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV/visible radiation is obtained by using a mask or screen having a radiation (e.g., UV/visible) permeable region, a radiation (e.g., UV/visible) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV/visible radiation) having a cross-sectional profile defined by the projection contour of the mask or screen. The projected beam of radiation (e.g., UV/visible radiation) limits radiation (e.g., UV/visible radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV/visible beam (i.e., a spatial limitation of radiation). The radiation used for the crosslinking is a radiation energy, especially UV/visible radiation, gamma radiation, electron radiation or thermal radiation, the radiation energy preferably being in the form of a substantially parallel beam in order on the one hand to achieve good restriction and on the other hand efficient use of the energy.

In the conventional cast-molding process, the first and second molding surfaces of a mold are pressed against each other to form a circumferential contact line which defines the edge of a result contact lens. Because the close contact of the molding surfaces can damage the optical quality of the molding surfaces, the mold cannot be reused. In contrast, in the Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

"Dye" means a substance that is soluble in a lens-forming fluid material and that is used to impart color. Dyes are typically translucent and absorb but do not scatter light.

A "pigment" means a powdered substance (particles) that is suspended in a lens-forming composition in which it is insoluble.

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Pat. No. 7,858,000 (herein incorporated by reference in its entirety), and a hydrophilic coating composed of covalent attachment or physical deposition of one or more layers of one or more hydrophilic polymer onto the surface of a contact lens disclosed in U.S. Pat. Nos. 8,147,897 and 8,409,599 and US Patent Application Publication Nos. 2011/0134387, 2012/0026457 and 2013/0118127 (herein incorporated by references in their entireties).

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (advancing angle measured by Sessile Drop), which is obtained by averaging measurements of at least 3 individual contact lenses.

The intrinsic "oxygen permeability", Dk, of a material is the rate at which oxygen will pass through a material. As used in this application, the term "oxygen permeability (Dk)" in reference to a hydrogel (silicone or non-silicone) or a contact lens means a measured oxygen permeability (Dk) which is corrected for the surface resistance to oxygen flux caused by the boundary layer effect according to the procedures shown in Examples hereinafter. Oxygen permeability is conventionally expressed in units of barrers, where "barrer" is defined as $[(cm^3 \text{ oxygen})(mm)/(cm^2)(sec)(mm\ Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm\ Hg)] \times 10^{-9}$.

A "chain-extended polydiorganosiloxane vinylic crosslinker" refers to a compound which comprises at least two ethylenically unsaturated groups and at least two polydiorganosiloxane segments separated by a linkage.

As used in this application, the term "clear" in reference to a lens-forming composition means that the lens-forming composition is a transparent solution or liquid mixture (i.e., having a light transmissibility of 85% or greater, preferably 90% or greater in the range between 400 to 700 nm).

In general, the invention is directed to a class of polymerizable polydimethylsiloxane-polyoxyalkylene block copolymers which each comprise: (1) a linear polymer chain comprising at least two polydimethylsiloxane segments, one hydrophilic polyoxyalkylene segment between each pair of polydimethylsiloxane segments, and one amide-rich linker between each pair of one polydimethylsiloxane segment and one hydrophilic polyoxyalkylene segment; (2) two terminal (meth)acryloyl groups, wherein the polydimethylsiloxane-polyoxyalkylene block copolymer has an average molecular weight of at least 3000 Daltons.

There are several potential unique features associated with use of chain-extended polydiorganosiloxane vinylic crosslinkers of the invention in making silicone hydrogel contact lens.

First, a polymerizable polydimethylsiloxane-polyoxyalkylene block copolymer of the invention is more compatible with other hydrophilic polymerizable components (e.g., hydrophilic vinylic monomer, hydrophilic crosslinking agent, and/or hydrophilic prepolymer), because of the presence of at least one hydrophilic polymer segment. It is suitable for preparing various solvent-containing or solventless lens formulations which can contain a large amount of hydrophilic polymerizable component and are still clear at room temperature or even at a low storage temperature of from about 0° C. to about 4° C. Such a lens formulation can be advantageously prepared in advance in the production.

Second, because each polydimethylsiloxane segment has at least 5 dimethylsiloxane units in a consecutive sequence, a polymerizable polydimethylsiloxane-polyoxyalkylene block copolymer of the invention may be used to efficiently provide relatively-high oxygen permeability per siloxane unit without adversely affecting its compatibility with other hydrophilic polymerizable components.

Third, a polymerizable polydimethylsiloxane-polyoxyalkylene block copolymer of the invention is prepared according to two well-known click reactions: thiol-lactone ring-opening reaction and thiol-Michael Addition reaction.

Fourth, there is no need for the isolation and purification of intermediate chemicals in the preparation of a polymerizable polydimethylsiloxane-polyoxyalkylene block copolymer of the invention.

The present invention, in one aspect, provides a polymerizable polydimethylsiloxane-polyoxyalkylene block copolymer of formula (I)

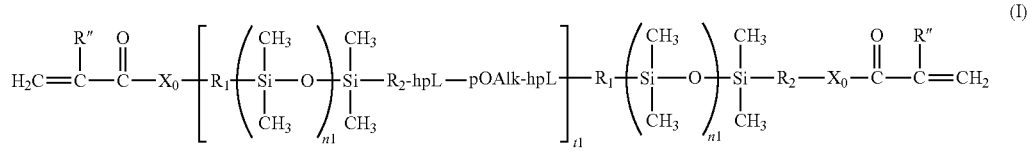

in which:
n1 is an integer of from 5 to 50;
t1 is an integer of from 1 to 15;
$X_0$ is O or NR' in which R' is hydrogen or $C_1$-$C_4$-alkyl;
R" is hydrogen or methyl;
$R_1$ and $R_2$ independent of each other are a $C_1$-$C_6$ alkylene divalent radical or a $C_1$-$C_6$ alkylene-oxy-$C_1$-$C_6$ alkylene divalent radical;
pOAlk is a divalent radical of formula (II)

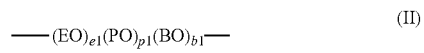

in which EO is an oxyethylene unit (—$CH_2CH_2O$—), PO is an oxypropylene unit

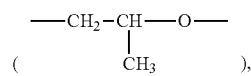

and BO is an oxybutylene unit

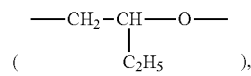

e1 is an integer of 5 to 100, p1 and b1 independent of each other are an integer of 0 to 50, provided that (e1+p1+b1)≥10, and if (p1+b1)≥1, e1/(p1+b1)≥2 (preferably from about 2:1 to about 10:1, more preferably from about 3:1 to about 6:1);
hpL is a divalent radical of formula (III) or (IV)

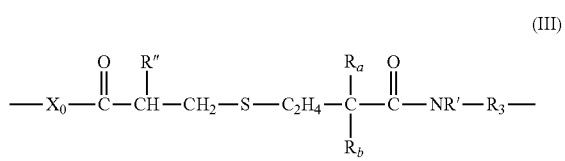

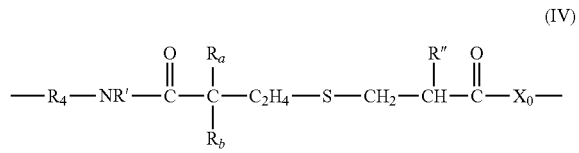

in which $R_3$ and $R_4$ independent of each other are a substituted or unsubstituted $C_1$-$C_{12}$ alkylene divalent radical, $R_a$ is hydrogen or methyl (preferably hydrogen), and $R_b$ is hydrogen, $C_1$-$C_3$ alkyl, acetyl, or $C_2$-$C_4$ alkanoylamino (e.g., acetylamino, propionylamino, butyrylamino) which optionally has a carboxyl group (preferably acetylamino, propionylamino or butyrylamino, more preferably acetylamino or propionylamino, even more preferably acetylamino), wherein the chain-extended polydiorganosiloxane vinylic crosslinker has an average molecular weight of at least 3000 Daltons.

In accordance with a preferred embodiment, a polymerizable polydimethylsiloxane-polyoxyalkylene block copolymer of formula (I) has an average molecular weight of preferably from about 4000 Daltons to about 100,000 Daltons, more preferably from about 5000 Daltons to about 50,000 Dalton, even more preferably from about 7000 Daltons to about 25,000 Daltons.

A polymerizable polydimethylsiloxane-polyoxyalkylene block copolymer of formula (I) can be prepared in a 2-step reaction scheme. In the first step, a diamino-terminated polyoxyalkylene can be reacted with N-acetylhomocysteine As an illustrative example, Scheme 1 shows how to prepare a polymerizable polymerizable polydimethylsiloxane-polyoxyalkylene block copolymer of formula (I) from diaminoalkyl-terminated polyoxyethylene ($H_2N$—$R_3$-$(EO)_{e1}$—$R_4$—$NH_2$), N-acetylhomocysteine thiolactone, and diacrylamido-terminated polydimethylsiloxane. It is understood that the diaminoalkyl-terminated polyoxyethylene can be replaced by a diaminoalkyl-terminated polyoxyethylene-polyoxypropylene di- or tri-block copolymer or a diaminoalkyl-terminated polyoxyethylene-polyoxybutylene di- or tri-block copolymer, and/or that the diacrylamido-terminated polydimethylsiloxane can be replaced by a dimethacrylamido-terminated polydimethylsiloxane or a di-(meth)acryloyloxy-terminated polydimethylsiloxane, to obtain a polymerizable polydimethylsiloxane-polyoxyalkylene block copolymer of formula (I).

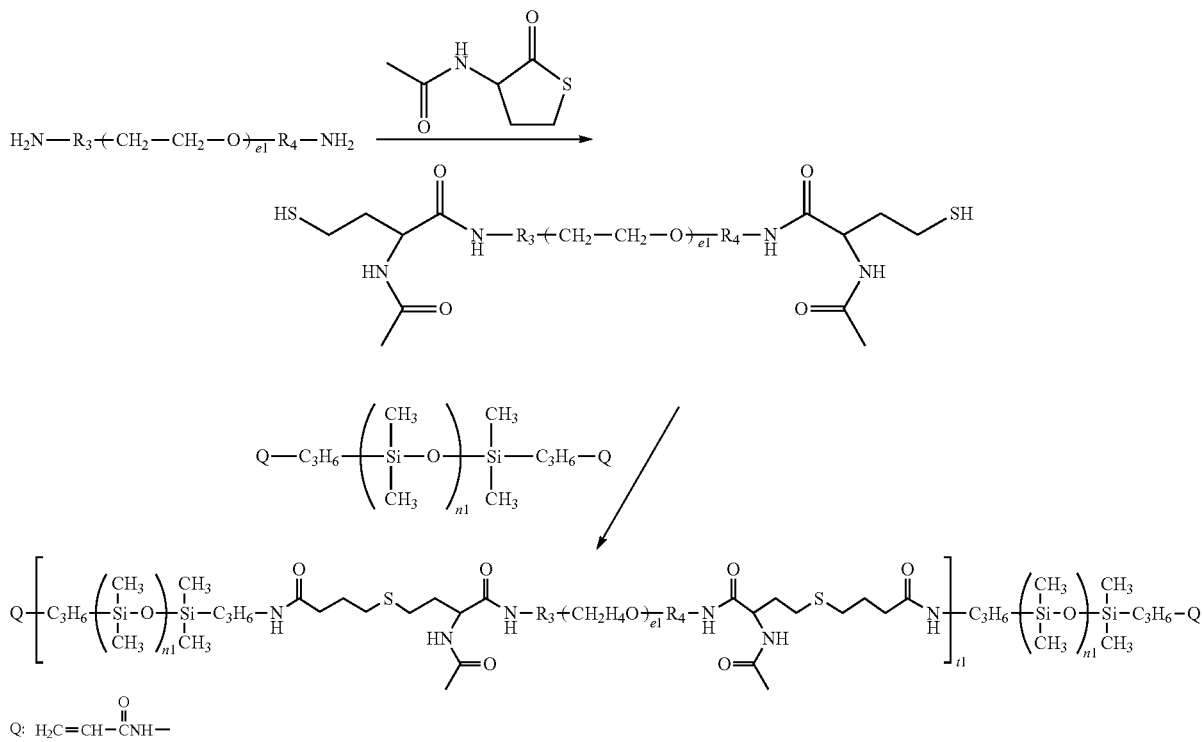

Scheme 1 thiolactone (or any thiolactone) to obtain a dithiol-terminated polyoxyalkylene. In the second step, the dithiol-terminated polyoxyalkylene can be reacted with a di-(meth)acryloyl-terminated polydimethylsiloxane according to Thiol Michael Addition reaction, to obtain a polymerizable polydimethylsiloxane-polyoxyalkylene block copolymer of formula (I). It is understood that the molar equivalent ratio of dithiol-terminated polyoxyalkylene to di-(meth)acryloyl-terminated polydimethylsiloxane should be less than 1 in order to obtained di-(meth)acryloyl-terminated polydimethylsiloxane-polyoxyalkylene block copolymer. A person skilled in the art knows how to control the number of polydimethylsiloxane segments in the resultant (meth)acryloyl-terminated polydimethylsiloxane-polyoxyalkylene block copolymer by varying the molar equivalent ratio of dithiol-terminated polyoxyalkylene to di-(meth)acryloyl-terminated polydimethylsiloxane.

It is understood that, in the first step in Scheme 1, N-acetyl homocysteine thiolactone can be substituted with any thiolactone to obtain a hydrophilic copolymer of the invention. Examples of preferred commercially-available thiolactone include without limitation 4-butyrothiolactone (or dihydro-2(3H)-thiophenone), 3-methyldihydro-2(3H)-thiophenone, 3-ethyldihydro-2(3H)-thiophenone, 3-(1-methylethyl)dihydro-2(3H)-thiophenone, 3,3-dimethyldihydro-2(3H)-thiophenone, 3-ethyl-3-methyldihydro-2(3H)-thiophenone, 3-acetyldihydro-2(3H)-thiophenone, N-acetyl homocysteine thiolactone, N-propionyl homocysteine thiolactone, N-butyryl homocysteine thiolactone, and N-carboxybutyryl homocysteine thilactone (or 4-oxo-4-[(tetrahydro-2-oxo-3-thienyl)amino]-butanoic acid).

Any di-(meth)acryloyl-terminated polydimethylsiloxanes can be used in the invention. Examples of preferred di-(meth)acryloyl-terminated polydimethylsiloxanes include without limitation α,ω-bis[3-(meth)acrylamidopropyl]-terminated polydimethylsiloxane, α,ω-bis[3-(meth)acryloxypropyl]-terminated polydimethylsiloxane, α,ω-bis[(meth)acryloxyethoxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxyethylamino-2-hydroxypropyloxy-propyl]-terminated polydimethylsiloxane, α,ω-bis[3-(meth)acrylamidoethoxy-2-hydroxypropyloxypropyl]-terminated polydimethylsiloxane, α,ω-bis[(meth)acrylamide-ethylamino-2-hydroxypropyloxypropyl]-terminated polydimethylsiloxane, α,ω-bis[3-(meth)acryloxypropoxy-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acrylamidopropoxy-2-hydroxypropyloxypropyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamidoisopropoxy-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis-[(meth)acryloxy-2-hydroxypropyl-oxycabonylpropyl]-terminated polydimethylsiloxane, α,ω-bis[(meth)acryloxy-2-hydroxypropyl-oxypentylcabonyloxyalkyl]-terminated polydimethylsiloxane, and α,ω-bis-[(meth)acryloxy-2-hydroxypropyl-oxy(polyethylenoxy)propyl]-terminated polydimethylsiloxane.

Any diamino-terminated polyoxyethylenes, diamino-terminated polypolyoxyethylene-polyoxypropylene di-block copolymers, diamino-terminated polypolyoxyethylene-polyoxypropylene tri-block copolymers, diamino-terminated polypolyoxyethylene-polyoxybutylene di-block copolymers, diamino-terminated polypolyoxyethylene-polyoxybutylene tri-block copolymers can be used in the invention. They can be obtained from commercial sources. Alternatively, they can be prepared from dihydroxy-terminated polyoxyalkylene according to methods known to a person skilled in the art, e.g., those described in U.S. Pat. Nos. 4,179,337 and 5,206,344, U.S. Pat. Appl. Pub. No. 20030149307, and in the papers published by De Vos and Goethals (Makromol. Chem., Rapid Commun. 6, 53-56 (1985)) and by Buckmann et al. (Biotechnology and Applied Biochemistry 9, 258-268 (1987)), herein incorporated by references in their entireties.

The dihydroxy-terminated polypolyoxyethylene-polyoxybutylene block copolymers may be synthesized according to procedures described in U.S. Pat. No. 8,318,144 (herein incorporated in reference in its entirety).

In accordance with the invention, diamino-terminated polyoxyakylene utilized in the present invention have a molecular weight in the range of preferably from 250 to about 50,000 Daltons; and more preferably from about 500 to about 10,000 Daltons.

A polymerizable polymerizable polydimethylsiloxane-polyoxyalkylene block copolymer of the invention (formula (I) as defined above) can find particular use in preparing a polymer, preferably a silicone hydrogel polymeric material, which is another aspect of the invention. A person skilled in the art knows how to prepare a polymer or a silicone hydrogel polymeric material from a polymerizable composition according to any known polymerization mechanism.

In another aspect, the invention provides a silicone hydrogel contact lens comprising a crosslinked polymeric material comprising: units of a polymerizable polydimethylsiloxane-polyoxyalkylene block copolymer of formula (I) (as defined above), units of a siloxane-containing vinylic monomer, units of at least one hydrophilic vinylic monomer, wherein the silicone hydrogel contact lens, when being fully hydrated, has an oxygen permeability (Dk) of at least about 70 barrers (preferably at least about 80 barrers, more preferably at least about 90 barrers, even more preferably at least about 100 barrers), a water content of from about 25% to about 70% by weight (preferably from about 30% to about 65% by weight, more preferably from about 35% to about 60% by weight, even more preferably from about 40% to about 55% by weight), an elastic modulus of from about 0.20 MPa to about 1.2 MPa (preferably from about 0.25 MPa to about 1.0 MPa, more preferably from about 0.3 MPa to about 0.9 MPa, even more preferably from about 0.4 MPa to about 0.8 MPa).

A person skilled in the art knows well how to measure the oxygen permeability, oxygen transmissibility, water content, elastic modulus, and lens diameter of silicone hydrogel contact lenses. These lens properties have been reported by all manufacturers for their silicone hydrogel contact lens products.

Various embodiments of a polymerizable polydimethylsiloxane-polyoxyalkylene block copolymer of formula (I) (as defined above) should be incorporated into this aspect of the invention.

Any suitable siloxane-containing vinylic monomers can be used in the invention. A class of preferred siloxane-containing vinylic monomers is those containing a tris(trialkylsiloxy)silyl group or a bis(trialkylsilyloxy)alkylsilyl group. Examples of such preferred silicone-containing vinylic monomers include without limitation 3-acrylamidopropyl-bis(trimethylsiloxy)methylsilane, 3-N-methyl acrylamidopropylbis(trimethylsiloxy)methylsilane, N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl) propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl) propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxyethoxypropyloxy-propyl-bis(trimethylsiloxy)methylsilane, N-2-methacryloxyethyl-O-(methyl-bis-trimethylsiloxy-3-propyl)silylcarbamate, 3-(trimethylsilyl)

propylvinyl carbonate, 3-(vinyloxycarbonylthio)propyl-tris(trimethyl-siloxy)silane, 3-[tris(trimethylsiloxy)silyl] propylvinyl carbamate, 3-[tris(trimethylsiloxy)silyl] propyl allyl carbamate, 3-[tris(trimethylsiloxy)silyl]propyl vinyl carbonate, t-butyldimethyl-siloxyethyl vinyl carbonate, trimethylsilylethyl vinyl carbonate, trimethylsilylmethyl vinyl carbonate, and hydrophlized siloxane-containing vinylic monomers disclosed in U.S. Pat. Nos. 9,103,965, 9,475,827, and 9,097,840 (herein incorporated by references in their entireties) which comprise at least one hydrophilic linkage and/or at least one hydrophilic chain.

Another class of preferred siloxane-containing vinylic monomers is polycarbosiloxane vinylic monomers (or carbosiloxane vinylic monomers). Examples of such polycarbosiloxane vinylic monomers or macromers are those described in U.S. Pat. Nos. 7,915,323 and 8,420,711, in US Patent Application Publication Nos. 2012/244088, 2012/245249, 2015/0309211, and 2015/0309210 (herein incorporated by references in their entireties).

A further class of preferred siloxane-containing vinylic monomers is polydimethylsiloxane-containing vinylic monomers. Examples of such polydimethylsiloxane-containing vinylic monomers are mono-(meth)acryloxy-terminated polydimethylsiloxanes of various molecular weight (e.g., mono-3-methacryloxypropyl terminated, mono-butyl terminated polydimethylsiloxane or mono-(3-methacryloxy-2-hydroxypropyloxy) propyl terminated, mono-butyl terminated polydimethylsiloxane), mono-(meth)acrylamido-terminated polydimethylsiloxanes of various molecular weight, or combinations thereof.

In accordance with the invention, a siloxane-containing vinylic monomer is preferably 3-(meth)acryloxy-2-hydroxypropyloxy)propylbis(trimethylsiloxy)methylsilane, 3-(meth)acryloxyethoxypropyloxypropylbis(trimethylsiloxy)methylsilane, 3-(meth)acrylamidopropyl-bis(trimethylsiloxy)methylsilane, 3-N-methyl (meth)acrylamidopropylbis(trimethylsiloxy) methylsilane, mono-(meth)acryloxy-terminated polydimethylsiloxanes of various molecular weight, mono-(meth)acrylamido-terminated polydimethylsiloxanes of various molecular weight, or a combination thereof.

It is understood that the crosslinked polymeric material of a silicone hydrogel contact lens of the invention can optionally comprise a polydimethylsiloxane vinylic crosslinker so long it is compatible with the hydrophilic polymerizable components in a lens-forming composition for making the silicone hydrogel contact lens.

Examples of preferred hydrophilic vinylic monomers include without limitation N-vinylpyrrolidone, N,N-dimethyl (meth)acrylamide, (meth)acrylamide, hydroxyethyl (meth)acrylamide, hydroxyethyl (meth)acrylate, glycerol methacrylate (GMA), polyethylene glycol (meth)acrylate, polyethylene glycol $C_1$-$C_4$-alkyl ether (meth)acrylate having a weight average molecular weight of up to 1500, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, (meth)acrylic acid, ethylacrylic acid, and combinations thereof. Preferably, the hydrophilic vinylic monomer is a hydrophilic N-vinyl monomer, such as, N-vinylpyrrolidone, N-vinyl-N-methyl acetamide, N-vinyl formamide, N-vinyl acetamide, N-vinyl isopropylamide, or combinations thereof. Even more preferably, the hydrophilic vinylic monomer is N-vinylpyrrolidone, N-vinyl-N-methyl acetamide, or combinations thereof.

In accordance with the invention, the crosslinked polymeric material of a silicone hydrogel contact lens of the invention can further comprise units of a hydrophobic vinylic monomer free of silicone, units of a non-silicone vinylic crosslinker, units of a UV-absorbing vinylic monomer, or a combination thereof.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethyl methacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

Examples of preferred non-silicone crosslinkers include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate (i.e., N,N'-2-phosphonyloxypropylene bis(meth)acrylamide), piperazine diacrylamide (or 1,4-bis(meth)acryloyl piperazine), vinyl methacrylate, allylmethacrylate, allylacrylate, N-allyl-methacrylamide, N-allyl-acrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane tri methacrylate, pentaerythritol tetramethacrylate, bisphenol A dimethacrylate, a product of diamine (preferably selected from the group consisting of N,N'-bis(hydroxyethyl)ethylenediamine, N,N'-dimethylethylenediamine, ethylenediamine, N, N'-dimethyl-1,3-propanediamine, N, N'-diethyl-1,3-propanediamine, propane-1,3-diamine, butane-1,4-diamine, pentane-1,5-diamine, hexamethylenediamine, isophorone diamine, and combinations thereof) and epoxy-containing vinylic monomer (preferably selected from the group consisting of glycidyl (meth)acrylate, vinyl glycidyl ether, allyl glycidyl ether, and combinations thereof), combinations thereof.

Examples of preferred UV-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol- 2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS#96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS#1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (901) (CAS#83063-87-0).

A silicone hydrogel contact lens can be prepared from a lens-forming composition according to a method of the invention which is another aspect of the invention.

In a further aspect, the present invention provides a method for producing silicone hydrogel contact lenses. The method comprises the steps of: preparing a lens-forming composition which is clear at room temperature and optionally but preferably at a temperature of from about 0 to about 4° C., wherein the lens-forming composition comprises (a) from about 5% to about 35% by weight of a polymerizable polydimethylsiloxane-polyoxyalkylene block copolymer of formula (I) (as defined above), (b) a siloxane-containing vinylic monomer, (c) from about 30% to about 60% by weight of at least one hydrophilic vinylic monomer, (d) at least one free-radical initiator, provided that the above-listed polymerizable components and any additional polymerizable components add up to 100% by weight; introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, and an elastic modulus of from about 0.2 MPa to about 1.2 MPa.

Various embodiments described above of a polymerizable polydimethylsiloxane-polyoxyalkylene block copolymer of formula (I) (as defined above) should be incorporated into this aspect of the invention.

Various embodiments described above of a siloxane-containing vinylic monomer, a hydrophilic vinylic monomer should be incorporated in this aspect of the invention.

In accordance with the invention, a free-radical initiator can be a thermal initiator or photoinitiator.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl)peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-050), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis (isobutyronitrile) (VAZO 64 or AlBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AlBN or VAZO 64). The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germane-based Norrish Type I photoinitiators. Examples of benzoylphosphine initiators include 2,4,6-trimethylbenzoyl-diphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Where a vinylic monomer capable of absorbing ultraviolet radiation and high energy violet light (HEVL) is used in the invention, a Germanium-based Norrish Type I photoinitiator and a light source including a light in the region of about 400 to about 550 nm are preferably used to initiate a free-radical polymerization. Any Germanium-based Norrish Type I photoinitiators can be used in this invention, so long as they are capable of initiating a free-radical polymerization under irradiation with a light in the region of about 400 to about 550 nm. Examples of Germanium-based Norrish Type I photoinitiators are acylgermanium compounds described in U.S. Pat. No. 7,605,190 (incorporated by reference in its entirety).

In a preferred embodiment, the lens-forming composition comprises an organic solvent.

Example of suitable solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

In another preferred embodiment, a lens-forming composition is a solution of all the desirable components dissolved in 1,2-propylene glycol, a polyethyleneglycol having a molecular weight of about 400 Daltons or less, or a mixture thereof.

In another preferred embodiment, the lens-forming composition is a solventless liquid mixture and comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), and combinations thereof. Preferably, the blending vinylic monomer is methylmethacrylate.

In another preferred embodiment, the total amount of all silicone-containing polymerizable components present in the lens-forming composition is about 65% or less.

In another preferred embodiment, the hydrophilic vinylic monomer is a hydrophilic N-vinyl monomer, preferably is N-vinylpyrrolidone, N-vinyl-N-methyl acetamide, N-vinyl formamide, N-vinyl acetamide, N-vinyl isopropylamide, or combinations thereof, even more preferably is N-vinylpyrrolidone, N-vinyl-N-methyl acetamide, or combinations thereof.

In another preferred embodiment, the lens-forming composition further comprises a non-silicone vinylic crosslinker. Various embodiments described above of a siloxane-containing vinylic monomer, a hydrophilic vinylic monomer should be incorporated in this aspect of the invention. The amount of a non-silicone vinylic crosslinker used is expressed in the weight content with respect to the total polymerizable components and is preferably in the range from about 0.05% to about 2%, and more preferably in the range from about 0.1% to about 1.5%, even more preferably in the range from about 0.15% to about 1.0%.

In accordance with the invention, the lens-forming composition can further comprise other components, such as, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-

S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, the lens-forming formulation (or composition) can be introduced (dispensed) into a cavity formed by a mold according to any known methods.

After the lens-forming composition is dispensed into the mold, it is polymerized to produce a contact lens. Cross-linking may be initiated thermally or actinically.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above. Preferably, water or an aqueous solution is used as extraction solvent. After extraction, lenses can be hydrated in water or an aqueous solution of a wetting agent (e.g., a hydrophilic polymer).

The molded contact lenses can further subject to further processes, such as, for example, surface treatment, packaging in lens packages with a packaging solution which can contain about 0.005% to about 5% by weight of a wetting agent (e.g., a hydrophilic polymer described above or the like known to a person skilled in the art) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization such as autoclave at from 118 to 124° C. for at least about 30 minutes; and the like.

In a preferred embodiment, the resultant silicone hydrogel contact lens is extracted with water or an aqueous solution.

In another preferred embodiment, the mold is a reusable mold and the lens-forming composition is cured (i.e., polymerized) actinically under a spatial limitation of actinic radiation to form a silicone hydrogel contact lens. Examples of preferred reusable molds are those disclosed in U.S. Pat. Nos. 6,627,124, 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, and combinations thereof.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A polymerizable polydimethylsiloxane-polyoxyalkylene block copolymer of formula (I)

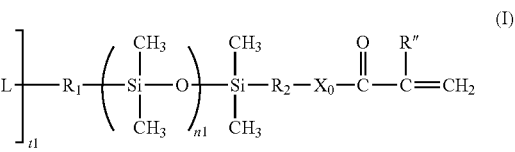

in which:
n1 is an integer of from 5 to 50;
t1 is an integer of from 1 to 15;
$X_0$ is O or NR' in which R' is hydrogen or $C_1$-$C_4$-alkyl;
R" is hydrogen or methyl;
$R_1$ and $R_2$ independent of each other are a $C_1$-$C_6$ alkylene divalent radical or a $C_1$-$C_6$ alkylene-oxy-$C_1$-$C_6$ alkylene divalent radical;
pOAlk is a divalent radical of formula (II)

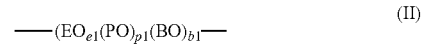

in which EO is an oxyethylene unit (—$CH_2CH_2O$—), PO is an oxypropylene unit of

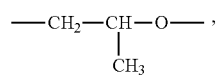

and BO is an oxybutylene unit of

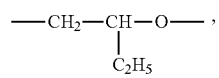

e1 is an integer of 5 to 100, p1 and b1 independent of each other are an integer of 0 to 50, provided that, (e1+p1+b1)≥10, and if (p1+b1)≥1, e1/(p1+b1)≥2;
hpL is a divalent radical of formula (III) or (IV)

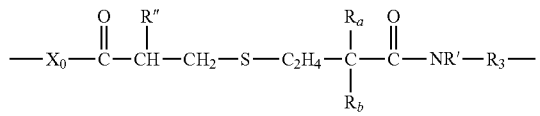

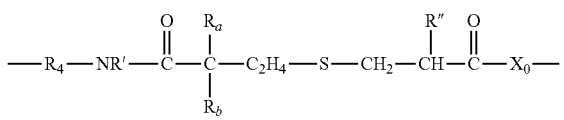

in which $R_3$ and $R_4$ independent of each other are a substituted or unsubstituted $C_1$-$C_{12}$ alkylene divalent radical, $R_a$ is hydrogen or methyl, and $R_b$ is hydrogen, $C_1$-$C_3$ alkyl, acetyl, or $C_2$-$C_4$ alkanoylamino which optionally has a carboxyl group,
wherein the chain-extended polydiorganosiloxane vinylic crosslinker has a number-average molecular weight of at least 3000 Daltons.

2. The polymerizable polydimethylsiloxane-polyoxyalkylene block copolymer according to invention 1, wherein in formula (III) and (IV) $R_a$ is hydrogen.
3. The polymerizable polydimethylsiloxane-polyoxyalkylene block copolymer according to invention 2, wherein in formula (III) and (IV) $R_b$ is hydrogen, acetylamino, propionylamino or butyrylamino.
4. The polymerizable polydimethylsiloxane-polyoxyalkylene block copolymer according to invention 2, wherein in formula (III) and (IV) $R_b$ is acetylamino, propionylamino or butyrylamino.
5. The polymerizable polydimethylsiloxane-polyoxyalkylene block copolymer according to invention 2, wherein in formula (III) and (IV) $R_b$ is acetylamino or propionylamino.
6. The polymerizable polydimethylsiloxane-polyoxyalkylene block copolymer according to invention 2, wherein in formula (III) and (IV) $R_b$ is acetylamino.
7. The polymerizable polydimethylsiloxane-polyoxyalkylene block copolymer according to any one of inventions 1 to 6, wherein in formula (II) (p1+b1)≥1 and e1/(p1+b1)≥2.
8. The polymerizable polydimethylsiloxane-polyoxyalkylene block copolymer according to invention 7, wherein e1/(p1+b1) is from about 2:1 to about 10:1.
9. The polymerizable polydimethylsiloxane-polyoxyalkylene block copolymer according to invention 7, wherein e1/(p1+b1) is from about 3:1 to about 6:1.
10. The polymerizable polydimethylsiloxane-polyoxyalkylene block copolymer according to invention 7 or 8 or 9, wherein p1 is zero.
11. The polymerizable polydimethylsiloxane-polyoxyalkylene block copolymer according to invention 7 or 8 or 9, wherein b1 is zero.
12. The polymerizable polydimethylsiloxane-polyoxyalkylene block copolymer according to any one of inventions 1 to 6, wherein p1 and b1 both are zero and e1 is an integer of from 10 to 100.
13. The polymerizable polydimethylsiloxane-polyoxyalkylene block copolymer according to any one of inventions 1 to 12, wherein the polymerizable polydimethylsiloxane-polyoxyalkylene block copolymer of formula (I) has a number-average molecular weight of from about 4000 Daltons to about 100,000 Daltons.
14. The polymerizable polydimethylsiloxane-polyoxyalkylene block copolymer according to any one of inventions 1 to 12, wherein the polymerizable polydimethylsiloxane-polyoxyalkylene block copolymer of formula (I) has a number-average molecular weight of from about 5000 Daltons to about 50,000 Dalton.
15. The polymerizable polydimethylsiloxane-polyoxyalkylene block copolymer according to any one of inventions 1 to 12, wherein the polymerizable polydimethylsiloxane-polyoxyalkylene block copolymer of formula (I) has a number-average molecular weight of from about 7000 Daltons to about 25,000 Daltons).
16. A silicone hydrogel contact lens comprising a crosslinked polymeric material which comprises:
   units of a polymerizable polydimethylsiloxane-polyoxyalkylene block copolymer according to any one of inventions 1 to 15;
   units of a siloxane-containing vinylic monomer;
   units of at least one hydrophilic vinylic monomer,
   wherein the silicone hydrogel contact lens, when being fully hydrated, has an oxygen permeability (Dk) of at least 70 barrers, a water content of from about 25% to about 70% by weight, an elastic modulus of from about 0.2 MPa to about 1.2 MPa.
17. The silicone hydrogel contact lens according to invention 16, wherein the hydrophilic vinylic monomer is N-vinylpyrrolidone, N,N-dimethyl (meth)acrylamide, (meth)acrylamide, hydroxyethyl (meth)acrylamide, hydroxyethyl (meth)acrylate, glycerol methacrylate (GMA), polyethylene glycol (meth)acrylate, polyethylene glycol $C_1$-$C_4$-alkyl ether (meth)acrylate having a number-average molecular weight of up to 1500, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, (meth)acrylic acid, ethylacrylic acid, or combinations thereof.
18. The silicone hydrogel contact lens according to invention 16, wherein the hydrophilic vinylic monomer is N-vinylpyrrolidone, N-vinyl-N-methyl acetamide, or combinations thereof.
19. The silicone hydrogel contact lens according to any one of inventions 16 to 18, wherein the crosslinked polymeric material further comprises units of a hydrophobic vinylic monomer free of silicone, units of a non-silicone vinylic crosslinker, units of a UV-absorbing vinylic monomer, or a combination thereof.
20. A method for producing silicone hydrogel contact lenses, comprising the steps of:
   preparing a lens-forming composition which is clear at room temperature and/or at a temperature of from about 0 to about 4° C., wherein the lens-forming composition comprises (a) from about 5% to about 35% by weight of a polymerizable polydimethylsiloxane-polyoxyalkylene block copolymer of any one of inventions 1 to 15, (b) a siloxane-containing vinylic monomer, (c) from about 30% to about 60% by weight of at least one hydrophilic vinylic monomer, (d) at least one free-radical initiator, provided that the above-listed polymerizable components and any additional polymerizable components add up to 100% by weight;
   introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; and
   curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, an elastic modulus of from about 0.2 MPa to about 1.2 MPa.
21. The method according to invention 20, wherein the lens-forming composition is a solventless liquid mixture and comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), and combinations thereof.
22. The method according to invention 20 or 21, wherein the blending vinylic monomer is methylmethacrylate.
23. The method according to invention 20, wherein the lens-forming composition comprises an organic solvent.
24. The method according to invention 23, wherein the organic solvent is 1,2-propylene glycol, a polyethyleneglycol having a number-average molecular weight of about 400 Daltons or less, or a mixture thereof.
25. The method according to any one of inventions 20 to 24, wherein the total amount of all silicone-containing polymerizable components present in the lens-forming composition is about 65% or less.
26. The method according to any one of inventions 20 to 25, wherein the hydrophilic vinylic monomer is a hydrophilic N-vinyl monomer.
27. The method according to any one of inventions 20 to 26, wherein the hydrophilic vinylic monomer is a hydrophilic N-vinyl monomer which is N-vinylpyrrolidone, N-vinyl-N- methyl acetamide, N-vinyl formamide, N-vinyl acetamide, N-vinyl isopropylamide, or combinations thereof.

28. The method according to any one of inventions 20 to 26, wherein the hydrophilic vinylic monomer is a hydrophilic N-vinyl monomer which is N-vinylpyrrolidone, N-vinyl-N-methyl acetamide, or combinations thereof.

29. The method according to any one of inventions 20 to 28, wherein the hydrophilic vinylic monomer is N-vinylpyrrolidone, N-vinyl-N-methyl acetamide, or combinations thereof.

30. The method according to any one of inventions 20 to 29, wherein the lens-forming composition further comprises a non-silicone vinylic crosslinker.

31. The method according to invention 30, wherein the non-silicone vinylic crosslinker is selected from the group consisting of ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate (i.e., N,N'-2-phosphonyloxypropylene bis(meth)acrylamide), piperazine diacrylamide (or 1,4-bis(meth)acryloyl piperazine), vinyl methacrylate, allylmethacrylate, allylacrylate, N-allyl-methacrylamide, N-allyl-acrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane tri methacrylate, pentaerythritol tetramethacrylate, bisphenol A dimethacrylate, combinations thereof.

32. The method according to invention 30, wherein the non-silicone vinylic crosslinker is selected from the group consisting of tetra(ethyleneglycol) di-(meth)acrylate, tri(ethyleneglycol) di-(meth)acrylate, ethyleneglycol di-(meth)acrylate, di(ethyleneglycol) di-(meth)acrylate, glycerol dimethacrylate, allyl (meth)acrylate, N,N'-methylene bis (meth)acrylamide, N,N'-ethylene bis(meth)acrylamide, N,N'-dihydroxyethylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate (i.e., N,N'-2-phosphonyloxypropylene bis(meth)acrylamide), piperazine diacrylamide (or 1,4-bis(meth)acryloyl piperazine), triallyl isocyanurate, tetraethyleneglycol divinyl ether, triethyleneglycol divinyl ether, diethyleneglycol divinyl ether, ethyleneglycol divinyl ether, and combinations thereof.

33. The method according to any one of inventions 20 to 32, wherein the siloxane-containing vinylic monomer is 3-(meth)acryloxy-2-hydroxypropyloxy)propylbis(trimethylsiloxy) methylsilane, 3-(meth)acryloxyethoxypropyloxy-propylbis(trimethylsiloxy)methylsilane, 3-(meth)acrylamidopropyl-bis(trimethylsiloxy)methylsilane, 3-N-methyl (meth)acrylamidopropyl-bis(trimethylsiloxy) methylsilane, mono-(meth)acryloxy-terminated polydimethylsiloxanes of various number-average molecular weight, mono-(meth)acrylamido-terminated polydimethylsiloxanes of various molecular weight, or a combination thereof.

34. The method according to any one of inventions 20 to 33, wherein the step of curing is carried out thermally.

35. The method according to any one of inventions 20 to 34, wherein the lens-forming composition is clear at room temperature.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

EXAMPLE 1

A polydimethylsiloxane-polyoxyalkylene block copolymer of the invention is prepared according to the procedures shown in Scheme 1.

Scheme 1

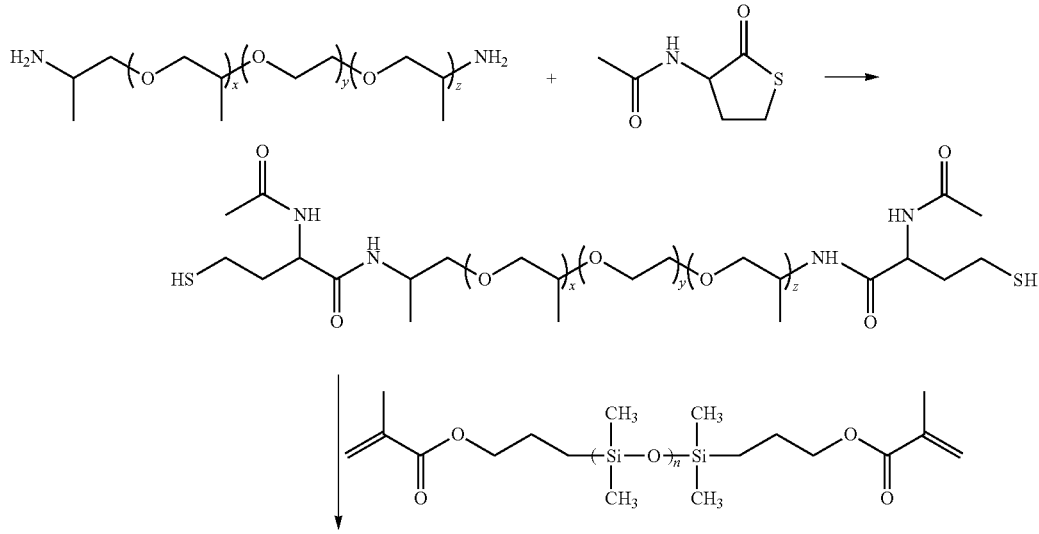

-continued

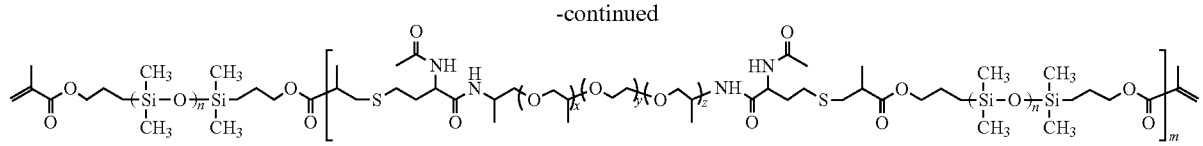

To a 500 mL jacketed reactor is added Jeffamine ED-900 (Aldrich 14527-500 mL-F, lot#BCBG7025V, MW~900, 3.00 g, 1 molar eq.), DL-N-actylhomocysteine thiolactone (made by Jintan Shuibei Pharmaceutical Factory, lot#151112, 1.07 g, 2.02 molar eq.) and isopropanol (16.29 g). The reactor is maintained at 25° C. using a circulator, and protected under nitrogen. The reaction is run overnight. To the reaction mixture is added PDMS dimethacrylate (Shin-Etsu X-22-164B, lot#009051, MW~5000, 16.00 g, 1.5 molar eq.), dimethylphenylphosphine (Aldrich 266020-5G, lot#MKBZ0750V, 47.4 µL, 0.1 molar eq.) and isopropanol (32.00 g). The reaction is run for 24 hours. The reaction mixture is transferred out, and 40 g of the solution is purified by repeated dialysis in isopropanol using Spectra/Por® membrane with a molecular weight cutoff of 1 k. After dialysis, the solution is concentrated by rotovap to give a viscous opaque white liquid (15.65 g).

EXAMPLE 2

A chain-extended polydimethylsiloxane vinylic crosslinker (CE-PDMS, M.W. ~9000 g/mol), which has three polydimethylsiloxane (PDMS) segments linked via diurethane linkages between two PDMS segments, is prepared according to the procedures similar to what described in Example 2 of U.S. Pat. No. 8,529,057 (herein incorporated by reference in its entirety).

EXAMPLE 3

A low molecular weight chain-extended polydimethylsiloxane vinylic crosslinker (LM CE-PDMS, M.W. ~6000 g/mol), which has three polydimethylsiloxane (PDMS) segments linked via diurethane linkages between two PDMS segments, is prepared according to the procedures similar to what described in Example 2 of U.S. Pat. No. 8,529,057 (herein incorporated by reference in its entirety).

EXAMPLE 4

Synthesis of the Precursor 275.9 g of octamethylcyclotetrasiloxane (M.W. 296.62), 12.0 g of 1,3,5,7-tetramethylcyclotetrasiloxane (M.W. 240.51), 9.7 g of 1,3-bis(3-methacryloxypropyl) tetramethyldisiloxane (M.W. 386.63), and 0.9 g of trifluoromethanesulfonic acid (M.W. 150.08) are weighed into a 500 mL round bottom flask. After the reaction is run at 35° C. for 24 h, 170 mL of 0.5% sodium hydrogen carbonate is added. The collected organic portion is further extracted five times with de-ionized water (170 mL per cycle). Anhydrous $MgSO_4$ is added to the collected organic solution, followed by ~350 mL of additional $CHCl_3$, and the solution is then stirred overnight. After filtration, the solvent is removed via Rotovap, followed by high vacuum. 102 g of final product (the precursor) is obtained.

Hydrosilylation Reaction with 3-Allyloxy-1,2-Propanediol to Form PDMS Crosslinker A small reactor is connected to a heater and air condenser with drying tube. 21 g of toluene, 15 g of above precursor, and 5.03 g of 3-allyloxy-1,2-propanediol are added to the reactor. After the solution temperature is stabilized at 30° C., 152 µL of Karstedt's catalyst (2 Pt % in xylene) is added. After 2 h, the conversion of Si—H of 100% based on IR is achieved. The solution is then transferred to a flask, concentrated using Rotovop, followed by precipitation in actenotrile/water mixture (75/25) three times. After removal of solvent via Rotovop, followed by high vacuum, 12 g of polydiorganosiloxane vinylic crosslinker with glycerol ether substituents (hazy liquid) is obtained.

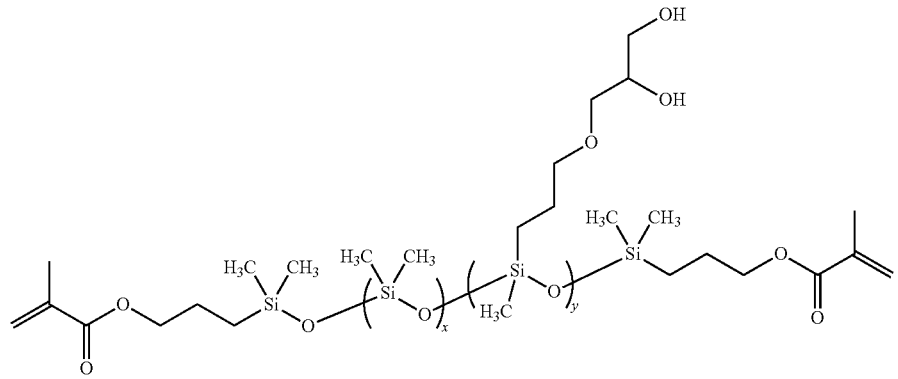

x = 93; y = 5

EXAMPLE 5

Synthesis of Glycerol Ether Containing PDMS Macromer (Macromer B)

Macromer B is prepared according to the procedures similar to what described in Example 2, except that the amounts of reactants in the first step for preparing precursor is changed. The obtained polydiorganosiloxane vinylic crosslinker with glycerol ether substituents has a structure formula

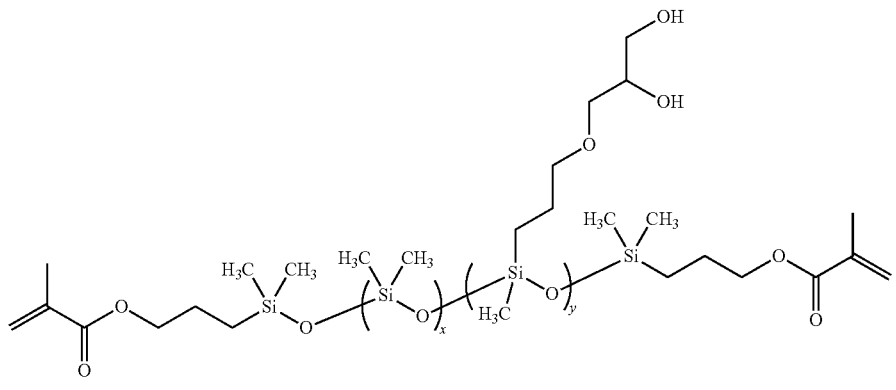

x = 106; y = 10

EXAMPLE 6

Compatibility with Hydrophilic Vinylic Monomers

A polydimethylsiloxane-polyoxyalkylene block copolymer, prepared in Example 1, is studied for its compatibility with N-vinylpyrrolidone (NVP) at a weight ratio of 1:1 at room temperature. For comparison, vinylic crosslinkers prepared in Examples 2 to 5 are also included in the study. Table 1 shows the results. It shows that a chain-extended polydimethylsiloxane vinylic crosslinker of the invention is most compatible with NVP.

TABLE 1

| Crosslinker. | NVP/Crosslinker (wt. ratio) | Compatibility |
|---|---|---|
| Example 1 | 1:1 | Compatible - homogeneous |
| Example 2 | 1:1 | Not compatible - phase separation |
| Example 3 | 1:1 | Partially compatible - homogenous, but quite hazy |
| Example 4 | 1:1 | Not compatible - phase separation |
| Example 5 | 1:1 | Compatible - homogenous |

It is found that, like a polydiorganosiloxane vinylic crosslinker with higher content of hydrophilic substituents (glycerol ether pendant chains), a polydimethylsiloxane-polyoxyalkylene block copolymer with hydrophilized linkages between polydimethylsiloxane segments is highly compatible with hydrophilic vinylic monomer, NVP, as shown by its capability to forming a homogeneous mixture at room temperature. These results indicate that the presence of hydrophilized linkages in a polydimethylsiloxane-polyoxyalkylene block copolymer of the invention can improve the capability of the crosslinker with hydrophilic vinylic monomers.

What is claimed is:

1. A polymerizable polydimethylsiloxane-polyoxyalkylene block copolymer of formula (I)

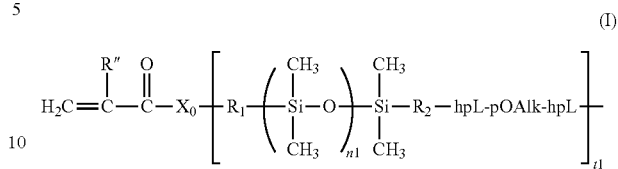

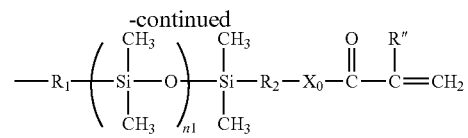

in which:

n1 is an integer of from 5 to 50;

t1 is an integer of from 1 to 15;

$X_0$ is O or NR' in which R' is hydrogen or $C_1$-$C_4$-alkyl;

R" is hydrogen or methyl;

$R_1$ and $R_2$ independent of each other are a $C_1$-$C_6$ alkylene divalent radical or a $C_1$-$C_6$ alkylene-oxy-$C_1$-$C_6$ alkylene divalent radical;

pOAlk is a divalent radical of formula (II)

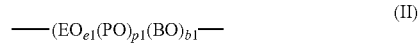

in which EO is an oxyethylene unit (—$CH_2CH_2O$—), PO is an oxypropylene unit of

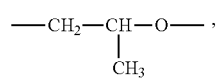

and BO is an oxybutylene unit of

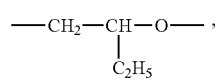

e1 is an integer of 5 to 100, p1 and b1 independent of each other are an integer of 0 to 50, provided that if (p1+b1)≥1, e1/(p1+b1)≥2;

and if p1 and b1 both are zero and e1 is an integer of 10-100 hpL is a divalent radical of formula (III) or (IV)

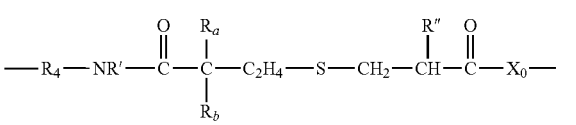

in which $R_3$ and $R_4$ independent of each other are a substituted or unsubstituted $C_1$-$C_{12}$ alkylene divalent radical, $R_a$ is hydrogen or methyl, and $R_b$ is hydrogen, $C_1$-$C_3$ alkyl, acetyl, or $C_2$-$C_4$ alkanoylamino which optionally has a carboxyl group, wherein the chain-extended polydiorganosiloxane vinylic crosslinker has a number-average molecular weight of at least 3000 Daltons.

2. The polymerizable polydimethylsiloxane-polyoxyalkylene block copolymer according to claim 1, wherein p1 is zero.

3. The polymerizable polydimethylsiloxane-polyoxyalkylene block copolymer according to claim 1, wherein b1 is zero.

4. A silicone hydrogel contact lens comprising a cross-linked polymeric material which comprises:
 units of a polymerizable polydimethylsiloxane-polyoxyalkylene block copolymer of claim 1;
 units of a siloxane-containing vinylic monomer;
 units of at least one hydrophilic vinylic monomer,
wherein the silicone hydrogel contact lens, when being fully hydrated, has an oxygen permeability (Dk) of at least 70 barrers, a water content of from about 25% to about 70% by weight, an elastic modulus of from about 0.2 MPa to about 1.2 MPa.

5. The silicone hydrogel contact lens according to claim 4, wherein the hydrophilic vinylic monomer is N-vinylpyrrolidone, N,N-dimethyl (meth)acrylamide, (meth)acrylamide, hydroxylethyl (meth)acrylamide, hydroxyethyl (meth)acrylate, glycerol methacrylate (GMA), polyethylene glycol (meth)acrylate, polyethylene glycol $C_1$-$C_4$-alkyl ether (meth)acrylate having a weight average molecular weight of up to 1500, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, (meth)acrylic acid, ethylacrylic acid, or combinations thereof.

6. The silicone hydrogel contact lens according to claim 5, wherein the crosslinked polymeric material further comprises units of a hydrophobic vinylic monomer free of silicone, units of a non-silicone vinylic crosslinker, units of a UV-absorbing vinylic monomer, or a combination thereof.

7. A method for producing silicone hydrogel contact lenses, comprising the steps of:

preparing a lens-forming composition which is clear at room temperature and/or at a temperature of from about 0 to about 4° C., wherein the lens-forming composition comprises (a) from about 5% to about 35% by weight of a polymerizable polydimethylsiloxane-polyoxyalkylene block copolymer of claim 1, (b) a siloxane-containing vinylic monomer, (c) from about 30% to about 60% by weight of at least one hydrophilic vinylic monomer, (d) at least one free-radical initiator, provided that the above-listed polymerizable components and any additional polymerizable components add up to 100% by weight;

introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; and curing thermally or actinically the lens-forming composition in the lens mold to form a silicone hydrogel contact lens, wherein the silicone hydrogel contact lens has an oxygen permeability (Dk) of at least 70 barrers, a water content of from about 25% to about 70% by weight, and an elastic modulus of from about 0.2 MPa to about 1.2 MPa.

8. The method according to claim 7, wherein the lens-forming composition is a solventless liquid mixture and further comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), and combinations thereof.

9. The method according to claim 7, wherein the lens-forming further composition comprises an organic solvent.

10. The method according to claim 7, wherein the total amount of all silicone-containing polymerizable components present in the lens-forming composition is about 65% or less.

11. The method according to claim 10, wherein the hydrophilic vinylic monomer is a hydrophilic N-vinyl monomer.

12. The method according to claim 11, wherein the lens-forming composition further comprises a non-silicone vinylic crosslinker selected from the group consisting of ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate (i.e., N,N'-2-phosphonyloxypropylene bis(meth)acrylamide), piperazine diacrylamide (or 1,4- bis(meth)acryloyl piperazine), vinyl methacrylate, allyl-methacrylate, allylacrylate, N-allyl-methacrylamide, N-allyl-acrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, combinations thereof.

13. The method according to claim 12, wherein the step of curing is carried out thermally.

14. The method according to claim 13, wherein the lens-forming composition is clear at room temperature and at a temperature of from about 0 to about 4° C.

15. The method according to claim 10, wherein the siloxane-containing vinylic monomer is 3-(meth)acryloxy-2-hydroxypropyloxy)propylbis(trimethylsiloxy)methylsilane, 3-(meth)acryloxyethoxypropyloxypropylbis(trimethylsiloxy)methylsilane, 3-(meth)acrylamidopropyl-bis(trimethylsiloxy)methylsilane, 3-N-methyl (meth)acrylamidopropylbis(trimethylsiloxy) methylsilane, mono-(meth)acryloxy-terminated polydimethylsiloxanes of various molecular weight, mono-(meth)acrylamido-terminated polydimethylsiloxanes of various molecular weight, or a combination thereof.

* * * * *